No. 802,138. PATENTED OCT. 17, 1905.
E. T. BYSHE.
METHOD OF FIXING THREADED PARTS TO EACH OTHER.
APPLICATION FILED FEB. 16, 1905.
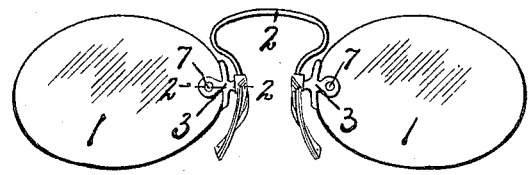
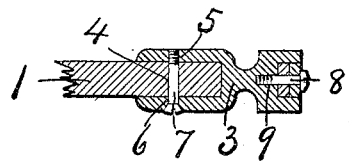
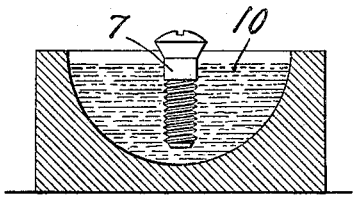
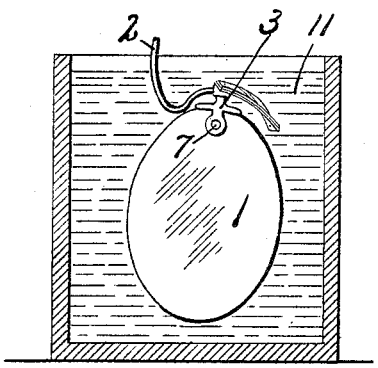
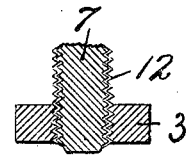
WITNESSES:
R. L. Nichols
B. E. Robinson
INVENTOR:
Ernest T. Byshe,
BY Howard P. Dawson
ATTORNEY.

UNITED STATES PATENT OFFICE.

ERNEST T. BYSHE, OF GENEVA, NEW YORK, ASSIGNOR TO THE STANDARD OPTICAL COMPANY, OF GENEVA, NEW YORK, A CORPORATION OF NEW YORK.

METHOD OF FIXING THREADED PARTS TO EACH OTHER.

No. 802,138.     Specification of Letters Patent.     Patented Oct. 17, 1905.

Application filed February 16, 1905. Serial No. 245,978.

*To all whom it may concern:*

Be it known that I, ERNEST T. BYSHE, of Geneva, in the county of Ontario, in the State of New York, have invented new and useful Improvements in Methods of Fixing Threaded Parts to Each Other, of which the following, taken in connection with the accompanying drawings, is a full, clear, and exact description.

This invention relates to improvements in the method of fixing screws and nuts to each other to prevent loosening of the parts, and is particularly useful in fastening the screw parts of spectacles and eyeglasses and other optical instruments requiring the use of small screws and nuts.

It is well known that the small screws which are used in assembling the parts of eyeglasses or spectacles are continually working loose and require frequent adjustment. This is particularly true in the fastenings for rimless glasses, in which the screws are usually passed through an aperture in the glass and engage a nut or threaded ear on the post or lens-clamp, for the reason that the screw cannot be too positively tightened without liability of cracking the glass. The result is that the screw soon loosens and allows the glass to rock more or less upon the screw, which soon enlarges the drill-hole in the glass and makes it almost impossible to prevent slight play of the lens in its support. I have sought to overcome these objectionable results by immersing the screw-threads into a suitable metal composition, which is fusible at a comparatively low temperature—as, for instance, in water at a temperature below 212° Fahrenheit. The immersion of the screw in this composition forms a comparatively thin coating upon the threads which cools almost immediately upon the withdrawal of the screw from the molten composition. This coating is extremely thin and does not destroy the contour of the threads, so that the coated screw may be readily inserted through the drill-hole in the glass or lens and screwed into its threaded aperture or nut of the lens-clamp, whereupon the lens and frame may be immersed in the warm or hot water usually below 212°, and preferably at a temperature of about 150° to 180°, at which temperature the metal composition or coating upon the screw is readily fused without liability of breaking the lens or in any way annealing the spring-bow or other parts of the frame. This fusing of the metal composition upon the screw-threads while engaged with its nut or threaded aperture causes such composition to adhere to the engaged threads of both screw and nut, so that when the lens and its frame is withdrawn from the heated water the composition soon congeals, thereby causing the screw and its nut to be practically fused together, it being understood that a suitable flux is previously applied to the threaded aperture or to both the aperture and the screw to remove any grease or foreign matter which might interfere with the rigid adhesion of the fusible material to the threads. Any suitable metal composition which is fusible at a temperature below 212° Fahrenheit—such as a mixture of about eight parts bismuth, three parts of tin, and five parts of lead—may be brought to a molten state in any convenient receptacle, after which the threaded part of the screw, after first being treated to a suitable flux, is immersed in such composition and then withdrawn, whereupon the coating adhering to the threaded part of the screw readily congeals. The threaded aperture which is to receive the screw is then treated to a flux, and the screw is then inserted in the aperture, after which the assembled parts are immersed in the liquid, such as water, which is transparent, and heated to a temperature at or below 212°, whereupon the coating on the screw is quickly fused and adheres to both the screw and its threaded aperture, thereby locking the two parts together with sufficient tenacity to prevent accidental separation or loosening of one part upon the other. I preferably use a composition which is sufficiently yielding that one of the parts may be turned upon the other by a suitable tool, as a screw-driver or wrench. In most instances, however, when it is desired to separate these parts they are immersed in hot water at a temperature of about 130° Fahrenheit and one of the parts loosened by a suitable tool while immersed, the heating agent serving to fuse the composition, and thereby facilitating the separation of the parts. These screws are made up in large quantities and sold to the trade, and one of the objects of my invention is to supply the trade with screws which are treated under my process so that the optician may purchase the coated screws and readily apply them in the assembling of the lenses and parts of the lens-supporting frame in the usual manner, after which it is only necessary to immerse the threaded parts in hot water at the temperature specified, which fuses the coating and causes it to adhere to the threads of both screw and nut, thereby rigidly securing them together against accidental separation, and if for any reason it might be desirable to separate these parts it can readily be done by reimmersing them in heated water and turning one part upon the other, it being understood that this reimmersion fuses the fixing composition sufficient to loosen the screw in its nut and that as soon as the parts are withdrawn from the heating agent the composition quickly congeals; but the screw may be used many times without recoating.

In the drawings, Figure 1 is an elevation of a pair of eyeglasses in which the threaded parts are fixed together under my improved process. Fig. 2 is an enlarged sectional view, taken on line 2 2, Fig. 1, showing the manner of securing the lens and its clamp to each other and to the bow. Fig. 3 is a sectional view of the receptacle for receiving the molten composition, showing a screw with its threads immersed in this composition as the first step in my process. Fig. 4 is an enlarged sectional view of a screw coated under my process and applied to a nut or threaded aperture. Fig. 5 is a sectional view of a receptacle containing the heating fluid, as water, at a temperature below 212°, in which I have shown the lens and part of the supporting-frame as immersed in the operation of fusing the composition coating upon the screws for fixing the threaded parts to each other.

I have shown the application of my process to the treatment of screws for eyeglasses, because it is extremely difficult to fasten the lens-clamps to rimless glasses or lenses without liability of breaking the lens or annealing the spring-bow. I have therefore shown a pair of rimless lenses 1 as mounted upon a suitable supporting-frame consisting in this instance of a bow 2 and lens-clamps 3, the lenses being provided with apertures 4, which are alined with similar apertures 5 and 6 in the lens-clamp 3 for receiving a screw 7, while the ends of the bow are secured to the lens-clamps 3 by screws 8, which enter threaded apertures 9 in the lens-clamps 3.

In assembling the lenses 1 and bow 2 upon the clamps 3 the screws 7 and 8 are first immersed in a molten composition 10 of bismuth, tin, and lead or other suitable mixture, whereupon when the screw is withdrawn a coating of such mixture is left upon the threaded portions of the screws, which when the coating has cooled are then screwed into place in their threaded apertures, after which the assembled parts, together with the screws 7 and 8, are immersed in a heating agent, as hot water 11, at a temperature below 212° Fahrenheit, as best seen in Fig. 5. Soon after these parts have been immersed in the heating agent the coating, as 12, Fig. 4, fuses and rigidly adheres to the threads of the screw and nut, so that when the parts are withdrawn from the heating agent the congealing of the fused parts causes said parts to be rigidly fused to each other. In some instances it may be desirable to apply a little flux to the threaded aperture which receives the coated screw, the operation of which is well known. Should it be desired to separate the threaded parts of the clamping device, the lens, together with such parts, may be reimmersed in the heating agent, and a suitable tool, as a screw-driver, may be applied to one of the threaded parts to remove the same, the heating agent readily fusing or softening the composition or coating to facilitate such removal.

Having thus described my invention, what I claim, and desire to secure by Letters Patent, is—

1. The herein-described method of fusing threaded parts to each other consisting in immersing one of the parts in a molten metal composition which is fusible at a temperature below the boiling-point of water to form a coating upon such part and then assembling the threaded parts one upon the other and afterward immersing them in a heating liquid at a temperature below 212° Fahrenheit.

2. The herein-described method of fixing the threaded parts of eyeglasses together consisting in coating one of the threaded parts with a material which is fusible in water at a temperature below the boiling-point, then screwing said parts together when the coating is hardened, and finally immersing the assembled parts in heated water at a temperature below the boiling-point but sufficient to melt the coating without liability of cracking the glass.

3. The herein-described method of fixing threaded parts together consisting of applying to one of the threaded parts a molten metal which is fusible at a temperature below the boiling-point of water, and allowing such applied metal to harden, afterward screwing the parts together and finally subjecting them to heat at a temperature below the boiling-point of water.

4. The herein-described method of fixing the threaded parts of eyeglasses together, consisting in coating one of the threaded parts with a material which is fusible at a temperature below the boiling-point of water, then screwing the parts together when the coating has hardened and finally applying heat to such parts at a temperature sufficiently low to prevent cracking of the glass.

In witness whereof I have hereunto set my hand on this 31st day of August, 1905.

ERNEST T. BYSHE.

Witnesses:
SMITH A. HARRIMAN,
MAUD E. DEMMING.